(12) United States Patent
Abdulkhair et al.

(10) Patent No.: US 12,415,177 B1
(45) Date of Patent: Sep. 16, 2025

(54) METHOD FOR SYNTHESIS OF A g-C₃N₄@CuO/MgAl₂O₄ NANOHYBRID

(71) Applicant: IMAM MOHAMMAD IBN SAUD ISLAMIC UNIVERSITY, Riyadh (SA)

(72) Inventors: Babiker Yagoub Elhadi Abdulkhair, Riyadh (SA); Mohamed Khairy Abdel Fattah Omran, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/206,235

(22) Filed: May 13, 2025

(51) Int. Cl.
*B01J 27/24* (2006.01)
*B01J 23/78* (2006.01)
(Continued)

(52) U.S. Cl.
CPC .............. *B01J 27/24* (2013.01); *B01J 23/78* (2013.01); *B01J 35/613* (2024.01); *B01J 35/633* (2024.01);
(Continued)

(58) Field of Classification Search
CPC ........ B01J 27/24; B01J 23/005; B01J 35/647; B01J 35/613; B01J 35/633; B01J 35/70;
(Continued)

(56) References Cited

U.S. PATENT DOCUMENTS

| | | | |
|---|---|---|---|
| 3,751,508 A * | 8/1973 | Fujiso | B01J 23/755 585/262 |
| 12,311,336 B1 * | 5/2025 | Abdulkhair | B01J 20/28071 |
| 2013/0168228 A1 | 7/2013 | Ozin et al. | |

FOREIGN PATENT DOCUMENTS

| CN | 111604084 A | 9/2020 |
|---|---|---|
| CN | 114307593 A | 4/2022 |

OTHER PUBLICATIONS

R. Suresh, et al., "Facile synthesis of CuO/g-C3N4 nanolayer composites with superior catalytic reductive degradation behavior", Chemosphere, vol. 315, Feb. 2023, 13771, 9 pages.
(Continued)

*Primary Examiner* — Patricia L. Hailey
(74) *Attorney, Agent, or Firm* — Oblon, McClelland, Maier & Neustadt, L.L.P.

(57) ABSTRACT

A method for synthesizing a g-C₃N₄@CuO/MgAl₂O₄ nanohybrid includes mixing a magnesium salt, an aluminum salt, a copper salt, and menthol in water to form a solution, heating the solution to form a solid, calcinating the solid at a temperature of 600 to 800° C. for 2 to 4 hours to form a metal product, and mixing the metal product with urea and heating to a temperature of 550 to 650° C. for 20 to 60 minutes to form the g-C₃N₄@CuO/MgAl₂O₄ nanohybrid. The g-C₃N₄@CuO/MgAl₂O₄ nanohybrid includes graphite-phase carbon nitride (g-C₃N₄) in an amount of 2 to 20 percent by weight (wt. %), copper oxide in an amount of 1 to 10 wt. %, and magnesium aluminum oxide (MgAl₂O₄) in an amount of 75 to 95 wt. % based on a total weight of the g-C₃N₄@CuO/MgAl₂O₄ nanohybrid.

20 Claims, 5 Drawing Sheets (51) Int. Cl.
  *B01J 35/61*   (2024.01)
  *B01J 35/63*   (2024.01)
  *B01J 35/64*   (2024.01)
  *B01J 35/70*   (2024.01)
  *B01J 37/04*   (2006.01)
  *B01J 37/08*   (2006.01)

(52) U.S. Cl.
  CPC .............. *B01J 35/647* (2024.01); *B01J 35/70* (2024.01); *B01J 37/04* (2013.01); *B01J 37/084* (2013.01); *B01J 37/088* (2013.01)

(58) Field of Classification Search
  CPC ... B01J 23/72; B01J 23/78; B01J 37/04; B01J 37/084; B01J 37/088
  USPC .......................... 502/174, 200, 341, 346, 524
  See application file for complete search history.

(56) References Cited

OTHER PUBLICATIONS

Worachita Wongtawee, et al., "Photocatalytic activity under visible light illumination of organic dyes over g-C3N4/MgAl2O4 nanocomposite", Journal of the Indian Chemical Society, vol. 99, Issue 8, Aug. 2022, 100628, 9 pages.

M. Muthukathija, et al., "A novel biogenic method to synthesis a ternary (ZnO-Ag)/g-C3N4 nanocomposite with an enhanced photocatalytic and antibacterial activities", Inorganic Chemistry Communications, vol. 154, Aug. 2023, 110877, 10 Pages.

\* cited by examiner

METHOD FOR SYNTHESIS OF A g-$C_3N_4$@CuO/Mg$Al_2O_4$ NANOHYBRID

BACKGROUND

Technical Field

The present disclosure is directed towards nanohybrid synthesis techniques, and more particularly, relates to a method for synthesizing a graphite-phase carbon nitride copper oxide and magnesium aluminum oxide (g-$C_3N_4$@CuO/Mg$Al_2O_4$) nanohybrid with a magnesium salt, an aluminum salt, a copper salt, and menthol.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

Carbon nanomaterials exhibit several advantageous properties, including a high specific surface area, which may facilitate increased contact with an electrolyte and expand an active area for various applications. Carbon nanomaterials possess good electrical conductivity, which is beneficial for efficient charge and discharge processes. Additionally, carbon nanomaterials demonstrate chemical stability and are readily incorporated into electrochemically active species, improving overall performance. Carbon nanomaterials are cost-effective and environmentally sustainable. Integration of carbon nanomaterials into composites alone or in combination with other materials, such as metal films or graphene, has been shown to improve energy density and rate performance of supercapacitors. The structural and electrical properties of carbon nanomaterials make carbon-based materials a promising solution for high-performance supercapacitors.

Graphitic or graphite-phase carbon nitride (g-$C_3N_4$) offers advantages over activated carbon in the context of supercapacitor applications. Graphitic carbon nitride functions as an active photocatalyst under visible light, unlike activated carbon, which remains non-active. Photocatalytic capabilities of graphitic carbon nitride allow for the utilization of solar energy for charge storage, offering a renewable and sustainable energy source. Graphitic carbon nitride has a narrower bandgap than activated carbon, enabling absorption of a broader range of light wavelengths to improve energy conversion efficiency and enhance supercapacitor performance. Graphitic carbon nitride may undergo structural modifications through carbon-defect and two-dimensional engineering. Modifications alter structural properties of the graphitic carbon nitride and may reduce material thickness, leading to an increased surface area and enhanced porosity. Increased surface area and enhanced porosity may contribute to improved charge storage capacity in supercapacitors. In view of the photoactivity of graphitic carbon nitride, broader light absorption range, and tunable structural properties, graphitic carbon nitride represents a highly suitable material for supercapacitor applications and clean energy generation.

Despite the numerous advantages associated with carbon-based materials, several limitations restrict the effectiveness of activated carbon and other carbon nanomaterials. Activated carbon, a commonly used material, has limited electrochemical activity, which reduces charge storage capacity in a supercapacitor. The large bandgap of activated carbon prevents utilization of solar energy for energy conversion, limiting applicability in photo-assisted charge storage systems. Surface properties of activated carbon may not be easily modified, which may restrict opportunities for structural and electrochemical enhancements. Other conventional carbon nanomaterials, including graphene and carbon nanotubes, exhibit aggregation tendencies, which diminish accessible surface area and negatively affect charge storage capabilities. Graphene and carbon nanotubes often require complex synthesis processes, leading to increased production costs and reduced scalability. In composite systems, challenges related to interfacial compatibility between carbon materials and electroactive species further impact performance and long-term stability.

Addressing limitations of activated carbon and other conventional carbon nanomaterials by developing alternative materials including carbon may offer good electrochemical activity, enhanced charge storage capabilities, and improved light absorption properties. An alternative material including carbon may possess a tunable structure, allowing modifications that adjust surface area and porosity for efficient ion diffusion and charge accumulation. An alternative material may enable solar energy utilization to enhance energy conversion efficiency, reducing reliance on conventional power sources. Incorporation of graphitic carbon nitride with materials such as metal oxides presents an approach to overcoming challenges, as materials comprising graphitic carbon nitride and metal oxides offer high photocatalytic activity, structural tunability, and improved electrochemical properties compared to traditional carbon-based materials.

Accordingly, an object of the present disclosure is to provide method of producing a graphite-phase carbon nitride copper oxide and magnesium aluminum oxide (g-$C_3N_4$@CuO/Mg$Al_2O_4$) nanohybrid that may circumvent drawbacks and limitations of methods and materials known in the art.

SUMMARY

In an exemplary embodiment, a method for synthesizing a graphite-phase carbon nitride copper oxide and magnesium aluminum oxide (g-$C_3N_4$@CuO/Mg$Al_2O_4$) nanohybrid is described.

The method includes mixing a magnesium salt, an aluminum salt, a copper salt, and menthol in water to form a solution. The method further includes heating the solution to form a solid, calcinating the solid at a temperature of 600 to 800° C. for 2 to 4 hours to form a metal product, and mixing the metal product with urea and heating to a temperature of 550 to 650° C. for 20 to 60 minutes to form the g-$C_3N_4$@CuO/Mg$Al_2O_4$ nanohybrid. The g-$C_3N_4$@CuO/Mg$Al_2O_4$ nanohybrid comprises graphite-phase carbon nitride (g-$C_3N_4$) in an amount of 2 to 20 percent by weight (wt. %), copper oxide in an amount of 1 to 10 wt. %, and magnesium aluminum oxide (Mg$Al_2O_4$) in an amount of 75 to 95 wt. % based on a total weight of the g-$C_3N_4$@CuO/Mg$Al_2O_4$ nanohybrid.

In some embodiments, a weight ratio of the menthol to the copper salt is from 10:1 to 1:10.

In some embodiments, the g-$C_3N_4$@CuO/Mg$Al_2O_4$ nanohybrid comprises graphite-phase carbon nitride (g-$C_3N_4$) in an amount of 5 to 15 wt. %, copper oxide in an amount of 3 to 7 wt. %, and magnesium aluminum oxide ($MgAl_2O_4$) in an amount of 80 to 90 wt. % based on a total weight of the g-$C_3N_4$@CuO/$MgAl_2O_4$ nanohybrid.

In some embodiments, the g-$C_3N_4$ is in the form of nanosheets have an average length of 100 to 500 nanometers (nm) and an average width of 50 to 250 nm.

In some embodiments, the copper oxide and the $MgAl_2O_4$ are in the form of nanoparticles having an average size of 2 to 10 nm and the copper oxide and the $MgAl_2O_4$ nanoparticles are dispersed on the g-$C_3N_4$ nanosheets.

In some embodiments, the g-$C_3N_4$@CuO/$MgAl_2O_4$ nanohybrid has a Brunauer-Emmett-Teller (BET) surface area of 15 to 30 $m^2$ $g^{-1}$.

In some embodiments, the g-$C_3N_4$@CuO/$MgAl_2O_4$ nanohybrid is porous and has an average pore diameter of 5 to 10 nm.

In some embodiments, the g-$C_3N_4$@CuO/$MgAl_2O_4$ nanohybrid is porous and has an average pore volume of 0.01 to 0.2 $cm^3$ $g^{-1}$.

In some embodiments, the g-$C_3N_4$@CuO/$MgAl_2O_4$ nanohybrid is porous, and the pores are in the form of slits.

In some embodiments, the g-$C_3N_4$@CuO/$MgAl_2O_4$ nanohybrid comprises a copper oxide (CuO) phase, a magnesium oxide (MgO) phase, a magnesium aluminum oxide ($MgAl_2O_4$) phase, and a graphite-phase carbon nitride (g-$C_3N_4$) phase.

In some embodiments, the $MgAl_2O_4$ phase is spinel.

In some embodiments, the MgO phase is cubic.

In some embodiments, the CuO phase is tenorite.

In some embodiments, the CuO phase is incorporated into the $MgAl_2O_4$ phase and the g-$C_3N_4$ phase.

In some embodiments, the g-$C_3N_4$@CuO/$MgAl_2O_4$ nanohybrid does not include aluminum oxide ($Al_2O_3$).

In some embodiments, the g-$C_3N_4$@CuO/$MgAl_2O_4$ nanohybrid has an interplanar spacing of 0.32 to 0.34 nm corresponding to a (002) diffraction plane of CN.

In some embodiments, the g-$C_3N_4$@CuO/$MgAl_2O_4$ nanohybrid has an interplanar spacing of 0.22 to 0.24 nm, 0.21 to 0.23 nm, 0.16 to 0.18 nm, 0.14 to 0.15 nm, 0.11 to 0.13 nm, and 0.09 to 0.11 nm corresponding to (111), (200), (422), (220), (620), and (622) diffraction planes, respectively.

In some embodiments, the g-$C_3N_4$@CuO/$MgAl_2O_4$ nanohybrid has an interplanar spacing of 0.24 to 0.26 nm and 0.19 to 0.21 nm corresponding to (222) and (400) diffraction planes, respectively.

In some embodiments, the g-$C_3N_4$@CuO/$MgAl_2O_4$ nanohybrid has a d-value of 0.15 to 0.17 nm corresponding to a lattice spacing of (422).

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

When describing the present disclosure, the terms used are to be construed in accordance with the following definitions, unless a context dictates otherwise.

Embodiments of the present invention will now be described more fully hereinafter with reference to the accompanying drawings wherever applicable, in that some, but not all, embodiments of the disclosure are shown.

In the drawings, like reference numerals designate identical or corresponding parts throughout the several views. Further, as used herein, the words "a," "an," and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

As used herein, the term "room temperature" refers to a temperature range of 25±3 degrees Celsius (° C.).

As used herein, the term "nanoparticles (NPs)" refers to particles having a particle size of 1 to 500 nanometers within the scope of the present invention.

As used herein, the term "nanocomposite" refers to a composite material that has at least one component with a grain size measured in nanometers. The term nanocomposite may refer to a material composed of two or more distinct components, at least one of which has a nanoscale structure, typically in the range of 1 to 100 nm. These components are combined to form a composite material that exhibits properties, such as increased strength, electrical conductivity, chemical reactivity, and/or thermal stability, compared to the individual components. Nanocomposites may be used in various applications, including catalysis, environmental remediation, electronics, and materials science.

As used herein, the term "surface area" refers to the total area of an exposed surface of a material per unit of mass or volume. It is typically measured in square meters per gram ($m^2$/g) and is a parameter for characterizing the adsorption capacity, reactivity, and porosity of a material, such as a nanocomposite. Surface area provides insights into how well a material can interact with other substances, such as molecules of a dye or other pollutants in a solution.

As used herein, the term "nanohybrid" refers to a material that combines nanomaterials (such as nanoparticles, nanotubes, or nanofibers) with another material, typically a polymer, metal, or ceramic, to form a composite structure. The nanomaterials are typically incorporated at the nanoscale level to enhance the properties of the base material, such as improving strength, conductivity, or flexibility, while maintaining the advantages of both components. The resulting nanohybrid composite exhibits properties that are different than individual materials alone.

As used herein, the term "porosity" refers to a measure of the void or vacant spaces within a material.

As used herein, the term "pore diameter" refers to an average width or size or length of void spaces (pores) within a material, typically measured in nm or angstroms (Å). Pore diameter is a parameter used in characterizing the texture and permeability of porous materials, which may influence their adsorption, filtration, and/or catalytic properties. Pore diameter is often determined using methods such as nitrogen adsorption or mercury intrusion, which provide insights into the material's ability to absorb or interact with molecules of specific sizes.

As used herein, the term "pore volume" refers to the total volume of void spaces (pores) within a material that is capable of being filled by a gas or liquid. It is typically expressed in cubic centimeters per gram ($cm^3/g$) and is a parameter used in characterizing the porous structure of materials, such as adsorbents or catalysts.

As used herein, the term "slit" or "slit-like" refers to an opening having a height that is substantially longer than the width of the opening.

As used herein, the term "ultrasonication" refers to a process that uses high-frequency sound waves to agitate particles in a liquid, creating pressure changes that generate microscopic bubbles. When these bubbles collapse, they produce shear forces that help break apart particles, disperse substances, or enhance chemical reactions.

As used herein, the term "spinel interplanar spacing" refers to the distance between parallel planes of atoms in the crystal structure of a spinel material. Spinel is a type of mineral with a specific crystalline arrangement, represented by the general formula $AB_2O_4$, where "A" and "B" are metal ions. Interplanar spacing assists in understanding a material's structural properties and is typically measured using X-ray diffraction (XRD) techniques.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

The present disclosure is intended to include all hydration states of a given compound or formula, unless otherwise noted or when heating a material.

The present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, and isotopes of carbon include $^{13}C$ and $^{14}C$. Isotopes of oxygen include $^{16}O$, $^{17}O$, and $^{18}O$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

Figure 1:
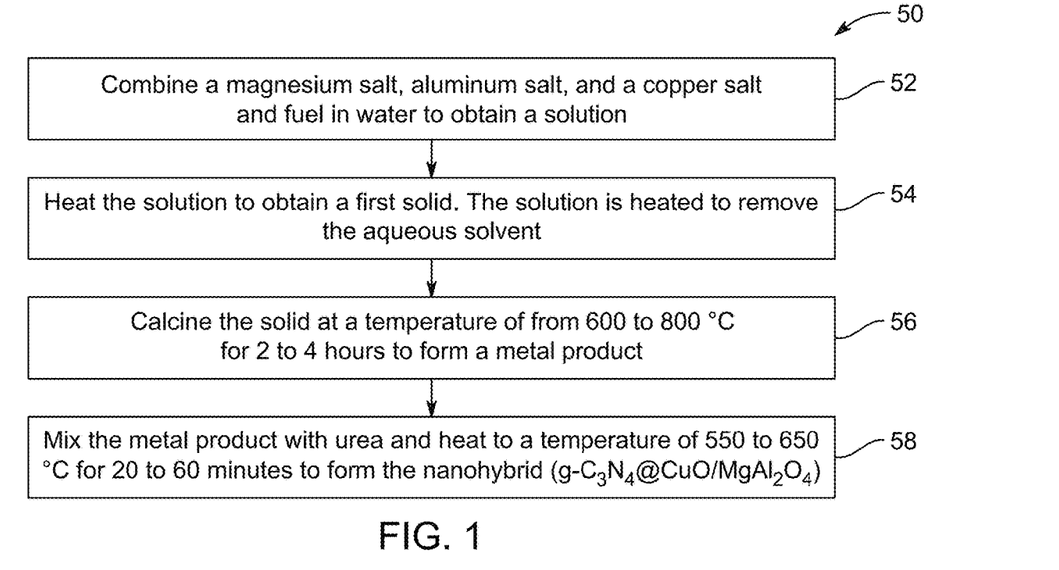
FIG. 1 is an exemplary flow chart of a method for synthesizing a graphite-phase carbon nitride copper oxide and magnesium aluminum oxide (g-$C_3N_4$@CuO/$MgAl_2O_4$) nanohybrid, according to certain embodiments.

Aspects of the present disclosure are directed to a method of forming a graphite-phase carbon nitride copper oxide and magnesium aluminate ($g-C_3N_4$@$CuO/MgAl_2O_4$) nanohybrid (also referred to as "$g-C_3N_4$@$CuO/MgAl_2O_4$ nanohybrid," "nanohybrid," "$g-C_3N_4$@$CuO/MgAl_2O_4$ material," "$g-C_3N_4$@$CuO/MgAl_2O_4$ composite," "composite," "$g-C_3N_4$@$CuO/MgAl_2O_4$ nanocomposite," "nanocomposite," "$g-C_3N_4$@$CuO/MgAl_2O_4$ catalyst," and "catalyst"). FIG. 1 illustrates a schematic flow chart of a method 50 for synthesizing the $g-C_3N_4$@$CuO/MgAl_2O_4$ nanohybrid. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

At step 52, the method 50 includes combining a magnesium salt, aluminum salt, a copper salt and menthol in water to obtain a solution. In some embodiments, the magnesium salt may include, but is not limited to, magnesium chloride, magnesium sulfate, magnesium carbonate, magnesium oxide, magnesium fluoride, magnesium bromide, magnesium iodide, magnesium hydroxide, magnesium citrate, magnesium malate, magnesium lactate, magnesium gluconate, magnesium ascorbate, magnesium tartrate, magnesium perchlorate, magnesium phosphate, magnesium stearate, magnesium pyrophosphate, magnesium silicate, magnesium borate, magnesium nitrate, magnesium formate, magnesium acetate, magnesium hypophosphite, magnesium tungstate, magnesium thiosulfate, magnesium nitride, magnesium aluminate, magnesium succinate, a combination thereof, and the like. In a preferred embodiment, the magnesium salt is magnesium nitrate ($Mg(NO_3)_2$).

In some embodiments, the aluminum salt may include, but is not limited to, aluminum nitrate, aluminum chloride, aluminum sulfate, aluminum acetate, aluminum bromide, aluminum nitrate, aluminum fluoride, aluminum iodide, aluminum thiocyanate, aluminum formate, aluminum lactate, a combination thereof, and the like. In a preferred embodiment, the aluminum salt is aluminum nitrate ($Al(NO_3)_3$).

In some embodiments, the copper salt may include, but is not limited to, copper benzoate, tetra-ammine copper citrate, copper oxide, copper bromide, copper oxalate, copper bromide, copper chloride, copper carbonate, copper oxide, copper fluoride, copper iodide, its hydrates, mixtures thereof, and the like. In a preferred embodiment, the copper salt is copper nitrate.

In some embodiments, a carbon source such as sucrose, fructose, glucose, maltose, dextrose, corn syrup, lactose, glycerol, mannitol, sorbitol, menthol, cellulose, combinations thereof, and the like may be used in combination with or in place of the menthol.

In some embodiments, a weight ratio of the menthol to the copper salt is from 10:1 to 1:10, preferably 9:1 to 1:9, preferably 8:1 to 1:8, preferably 7:1 to 1:7, preferably 6:1 to 1:6, preferably 5:1 to 1:5, preferably 4:1 to 1:4, preferably 3:1 to 1:3, preferably 2:1 to 1:2, and preferably about 1:1.

At step 54, the method 50 includes heating the solution to obtain a solid. The solution is heated to remove the aqueous solvent. The aqueous solvent is a solvent in which water serves as a primary (i.e., 50 percent by volume (vol. %) or more) medium for dissolving other substances. Water is a polar solvent, which enables it to dissolve a wide variety of ionic and polar compounds. The water may be tap water, distilled water, double-distilled water, deionized water, deionized distilled water, reverse osmosis water, a combination thereof, and/or some other water. Examples of aqueous solvents include water itself, as well as solutions like a sodium chloride solution, an acetic acid solution, an ethanol solution, a hydrochloric acid solution, a sodium hydroxide solution, an ammonia solution, a hydrogen peroxide solution, a sodium bicarbonate solution, a combination thereof, and the like. Other examples of aqueous solutions include, but are not limited to, a potassium permanganate solution, a citric acid solution, a potassium chloride solution, a glycerol solution, a urea solution, a calcium chloride solution, a magnesium sulfate solution, a sodium acetate solution, a formic acid solution, a sodium nitrate solution, combinations thereof, and the like. In a preferred embodiment, the aqueous solvent is distilled water.

In some embodiments, the heating can be performed using heating appliances such as ovens, microwaves, autoclaves, hot plates, heating mantles and tapes, oil baths, salt baths, sand baths, air baths, hot-tube furnaces, hot-air guns, a combination thereof, and the like. In some embodiments, the solution is heated to remove at least 99 wt. % of the aqueous solvent to obtain a solid. In some embodiments, the solution is heated to obtain the solid with at least 99 wt. %, preferably at least 99.1 wt. %, preferably at least 99.2 wt. %, preferably at least 99.3 wt. %, preferably at least 99.4 wt. %, preferably at least 99.5 wt. %, preferably at least 99.6 wt. %, preferably at least 99.7 wt. %, preferably at least 99.8 wt. %, more preferably at least 99.9 wt. %, and yet more preferably about 100 wt. % of the aqueous solvent removed.

In some embodiments, the solid is ground into a powder. The grinding may be carried out using any suitable means including, but not limited to, ball milling, blending, using manual methods (e.g., mortar), and/or using machine-assisted methods such as a mechanical blender and/or any other apparatus known to those of ordinary skill in the art. Grinding provides efficient and consistent particle size reduction. In a preferred embodiment, the solid is ground into a powder using a mortar and pestle.

At step 56, the method 50 includes calcining the solid at a temperature of 600 to 800° C., preferably 610 to 790° C., preferably 620 to 780° C., preferably 630 to 770° C., preferably 640 to 760° C., preferably 650 to 750° C., preferably 660 to 740° C., preferably 670 to 730° C., preferably 680 to 720° C., more preferably 690 to 710° C., and yet more preferably about 700° C. for 2 to 4 hours, preferably 2.1 to 3.9 hours, preferably 2.2 to 3.8 hours, preferably 2.3 to 3.7 hours, preferably 2.4 to 3.6 hours, preferably 2.5 to 3.5 hours, preferably 2.6 to 3.4 hours, preferably 2.7 to 3.3 hours, preferably 2.8 to 3.2 hours, more preferably 2.9 to 3.1 hours, and yet more preferably about 3 hours to form a metal product. The calcination of the solid is carried out by heating it to a high temperature, under a restricted supply of ambient oxygen. This is performed to remove impurities or volatile substances and to incur thermal decomposition. Typically, the calcination is carried out in a furnace preferably equipped with a temperature control system, which may provide a heating rate of up to 50° C. per minute (° C./min), preferably up to 40° C./min, preferably up to 30° C./min, preferably up to 20° C./min, preferably up to 10° C./min, preferably up to 5° C./min, preferably up to 2° C./min, and preferably up to 1° C./min. In a preferred embodiment, the solid is calcined at 700° C. for 3 hours to form the metal product.

At step 58, the method 50 includes mixing the metal product with urea and heating to a temperature of 550 to 650° C., preferably 560 to 640° C., preferably 570 to 630° C., preferably 580 to 620° C., more preferably 590 to 610° C., and yet more preferably about 600° C. for 20 to 60 minutes, preferably 25 to 55 minutes, preferably 30 to 50 minutes, more preferably 35 to 45 minutes, and yet more preferably about 40 minutes to form the $g\text{-}C_3N_4$@CuO/$MgAl_2O_4$ nanohybrid. In a preferred embodiment, the metal product is mixed with urea and heated to a temperature of 600° C. for 40 minutes to form the $g\text{-}C_3N_4$@CuO/$MgAl_2O_4$ nanohybrid. In some embodiments, other nitrogen-containing precursors such as melamine, dicyandiamide, ammonium thiocyanate, ammonium carbonate, a combination thereof, and the like may be used in place of or in combination with urea. These alternatives provide nitrogen for formation of carbon nitride structures.

The $g\text{-}C_3N_4$@CuO/$MgAl_2O_4$ nanohybrid comprises graphite-phase carbon nitride ($g\text{-}C_3N_4$) in an amount of 2 to 20 percent by weight (wt. %), copper oxide in an amount of 1 to 10 wt. %, and magnesium aluminum oxide ($MgAl_2O_4$) in an amount of 75 to 95 wt. % based on the total weight of the $g\text{-}C_3N_4$@CuO/$MgAl_2O_4$ nanohybrid.

In some embodiments, the metal product may be heated using heating appliances such as hot plates, furnaces, heating mantles ovens, microwaves, autoclaves, tapes, oil baths, salt baths, sand baths, air baths, hot-tube furnaces, hot-air guns, a combination thereof, and the like. In a preferred embodiment, the metal product is heated in a crucible in a furnace.

A graphite-phase carbon nitride copper oxide and magnesium aluminate ($g\text{-}C_3N_4$@CuO/$MgAl_2O_4$) nanohybrid including graphite-phase carbon nitride ($g\text{-}C_3N_4$), copper oxide (CuO), and magnesium aluminate ($MgAl_2O_4$) is described. The $g\text{-}C_3N_4$, CuO, and $MgAl_2O_4$ are present in the $g\text{-}C_3N_4$@CuO/$MgAl_2O_4$ nanohybrid in a mass relationship to each other in a range of 2 to 20:1 to 10:75 to 95, preferably 5 to 15:3 to 7:80 to 90, more preferably 7 to 13:3 to 6:82 to 88, and yet more preferably 9 to 11:4 to 5:84 to 86. In a preferred embodiment, $g\text{-}C_3N_4$, CuO, and $MgAl_2O_4$ are present in the $g\text{-}C_3N_4$@CuO/$MgAl_2O_4$ nanohybrid in a mass relationship to each other of about 10:5:85.

The $g\text{-}C_3N_4$@CuO/$MgAl_2O_4$ nanohybrid contains $g\text{-}C_3N_4$ in an amount of 2 to 20 percent by weight (wt. %), preferably 3 to 17 wt. %, preferably 5 to 15 wt. %, and more preferably 7 to 12 wt. % based on the total weight of the $g\text{-}C_3N_4$@CuO/$MgAl_2O_4$ nanohybrid. In a preferred embodiment, the $g\text{-}C_3N_4$@CuO/$MgAl_2O_4$ nanohybrid contains 10 wt. % of a graphite-phase carbon nitride ($g\text{-}C_3N_4$), based on a total weight of the $g\text{-}C_3N_4$@CuO/$MgAl_2O_4$ nanohybrid.

The $g\text{-}C_3N_4$@CuO/$MgAl_2O_4$ nanohybrid contains CuO in an amount of 1 to 10 wt. %, preferably 2 to 8 wt. %, preferably 3 to 7 wt. %, and more preferably 4 to 6 wt. % based on the total weight of the $g\text{-}C_3N_4$@CuO/$MgAl_2O_4$ nanohybrid. In a preferred embodiment, the $g\text{-}C_3N_4$@CuO/$MgAl_2O_4$ nanohybrid contains 5 wt. % CuO based on a total weight of the $g\text{-}C_3N_4$@CuO/$MgAl_2O_4$ nanohybrid.

The $g\text{-}C_3N_4$@CuO/$MgAl_2O_4$ nanohybrid contains magnesium aluminum oxide ($MgAl_2O_4$) in an amount of 75 to 95 wt. %, preferably 80 to 90 wt. %, preferably 82 to 88 wt. %, and more preferably 84 to 86 wt. % based on a total weight of the $g\text{-}C_3N_4$@CuO/$MgAl_2O_4$ nanohybrid. In a preferred embodiment, the $g\text{-}C_3N_4$@CuO/$MgAl_2O_4$ nanohybrid contains 85 wt. % of magnesium aluminum oxide ($MgAl_2O_4$) based on a total weight of the $g\text{-}C_3N_4$@CuO/$MgAl_2O_4$ nanohybrid.

In some embodiments, the $g\text{-}C_3N_4$@CuO/$MgAl_2O_4$ nanohybrid is porous. A porous material is the one that forms a porous bulk solid. Pores may be micropores, mesopores, macropores, and/or a combination thereof. In some embodiments, the pores exist in the bulk material, not necessarily in the molecular structure of the material. The term "microporous" refers to a nanohybrid that has pores with an average pore width (i.e., diameter) of less than 2 nm. The term "mesoporous" refers to pores of a nanohybrid having an average pore width of 2-50 nm. The term "macroporous" refers to pores of a nanohybrid having an average pore width larger than 50 nm. Pore size may be determined by methods including, but not limited to, gas adsorption (e.g., $N_2$ adsorption), mercury intrusion porosimetry, imaging techniques, such as scanning electron microscopy (SEM) and X-ray computed tomography (XRCT), a combination thereof, and the like.

In some embodiments, the g-$C_3N_4$@CuO/MgAl$_2$O$_4$ nanohybrid has a Brunauer-Emmett-Teller (BET) surface area of 15 to 30 m$^2$/g, preferably 16 to 28 m$^2$/g, preferably 17 to 27 m$^2$/g, preferably 19 to 26 m$^2$/g, more preferably 21 to 25 m$^2$/g, and yet more preferably 22 to 24 m$^2$/g. In a preferred embodiment, the surface area of the nanohybrid is about 23.21 m$^2$/g. BET analysis is a foundation for determining specific surface area of a material. It describes physical adsorption of gas molecules on a solid surface. Specific surface area is a property of solids, which is the total surface area of a material per unit of mass, solid or bulk volume, or cross-sectional area. In some embodiments, pore diameter, pore volume, and BET surface area are measured by gas adsorption analysis, preferably $N_2$ adsorption analysis (e.g., $N_2$ adsorption isotherms). In one embodiment, the g-$C_3N_4$@CuO/MgAl$_2$O$_4$ nanohybrid is porous, and the pores are in the form of slits.

In some embodiments, the average pore distribution of the g-$C_3N_4$@CuO/MgAl$_2$O$_4$ nanohybrid may include, but is not limited to, crystalline average pore distribution, bimodal, trimodal, multimodal, narrow, broad, Gaussian, a combination thereof, and the like. In a preferred embodiment, the average pore distribution of g-$C_3N_4$@CuO/MgAl$_2$O$_4$ nanohybrid is unimodal, indicating a single dominant pore size within the material. This unimodal distribution suggests that the g-$C_3N_4$@CuO/MgAl$_2$O$_4$ nanohybrid possess a relatively narrow pore size range, resulting in more uniform pore structures and enhancing specific properties such as adsorption capacity, catalytic activity, or surface reactivity.

In some embodiments, the g-$C_3N_4$@CuO/MgAl$_2$O$_4$ nanohybrid is porous and has an average pore diameter, according to a Barrett-Joyner-Halenda (BJH) measurement method, of 5 to 10 nm, preferably 6 to 9.5 nm, preferably 7 to 9 nm, and more preferably 8 to 8.5 nm. In a preferred embodiment, the g-$C_3N_4$@CuO/MgAl$_2$O$_4$ nanohybrid has an average pore diameter of about 8.34 nm.

In some embodiments, the g-$C_3N_4$@CuO/MgAl$_2$O$_4$ nanohybrid is porous and has an average pore volume, according to the BJH measurement method, of 0.01 to 0.2 cm$^3$/g, preferably 0.02 to 0.19 cm$^3$/g, preferably 0.03 to 0.18 cm$^3$/g, preferably 0.04 to 0.16 cm$^3$/g, preferably 0.05 to 0.14 cm$^3$/g, preferably 0.06 to 0.12 cm$^3$/g, and more preferably 0.07 to 0.1 cm$^3$/g. In a preferred embodiment, the g-$C_3N_4$@CuO/MgAl$_2$O$_4$ nanohybrid has an average pore volume of about 0.081 cm$^3$/g.

In some embodiments, the g-$C_3N_4$@CuO/MgAl$_2$O$_4$ nanohybrid has an interplanar spacing of 0.32 to 0.34 nm, preferably 0.322 to 0.338 nm, preferably 0.324 to 0.336 nm, preferably 0.326 to 0.334, more preferably 0.328 to 0.332 nm, and yet more preferably about 0.33 nm corresponding to a (002) diffraction plane of CN, according to selected area electron diffraction (SAED) patterns. In some embodiments, the g-$C_3N_4$@CuO/MgAl$_2$O$_4$ nanohybrid has an interplanar spacing of 0.22 to 0.24 nm, preferably 0.222 to 0.238 nm, preferably 0.224 to 0.236 nm, preferably 0.226 to 0.234 nm, more preferably 0.228 to 0.232 nm, and yet more preferably about 0.23 nm corresponding to a (111) diffraction plane, according to SAED patterns. In some embodiments, the g-$C_3N_4$@CuO/MgAl$_2$O$_4$ nanohybrid has an interplanar spacing of 0.21 to 0.23 nm, preferably 0.211 to 0.228 nm, preferably 0.212 to 0.226 nm, preferably 0.213 to 0.225 nm, preferably 0.214 to 0.224 nm, preferably 0.215 to 0.223 nm, preferably 0.216 to 0.222 nm, preferably 0.217 to 0.221 nm, more preferably 0.218 to 0.22 nm, and yet more preferably about 0.219 nm, corresponding to a (200) diffraction plane, according to SAED patterns. In some embodiments, the g-$C_3N_4$@CuO/MgAl$_2$O$_4$ nanohybrid has an interplanar spacing of 0.16 to 0.18 nm, preferably 0.162 to 0.178 nm, preferably 0.164 to 0.176 nm, preferably 0.166 to 0.174 nm, more preferably 0.168 to 0.172 nm, and yet more preferably about 0.17 nm, corresponding to a (422) diffraction plane, according to SAED patterns. In some embodiments, the g-$C_3N_4$@CuO/MgAl$_2$O$_4$ nanohybrid has an interplanar spacing of 0.14 to 0.15 nm, preferably 0.141 to 0.149 nm, preferably 0.142 to 0.148 nm, preferably 0.143 to 0.147 nm, preferably 0.145 to 0.147 nm, and yet more preferably about 0.146 nm, corresponding to a (220) diffraction plane, according to SAED patterns. In some embodiments, the g-$C_3N_4$@CuO/MgAl$_2$O$_4$ nanohybrid has an interplanar spacing of 0.11 to 0.13 nm, preferably 0.112 to 0.128 nm, preferably 0.114 to 0.127 nm, preferably 0.116 to 0.126 nm, preferably 0.118 to 0.125 nm, more preferably 0.12 to 0.124 nm, and yet more preferably about 0.122 nm, corresponding to a (620) diffraction plane, according to SAED patterns. In some embodiments, the g-$C_3N_4$@CuO/MgAl$_2$O$_4$ nanohybrid has an interplanar spacing of 0.09 to 0.11 nm, preferably 0.092 to 0.108 nm, preferably 0.094 to 0.106 nm, preferably 0.096 to 0.104 nm, more preferably 0.098 to 0.102 nm, and yet more preferably about 0.1 nm, corresponding to a (622) diffraction plane, according to SAED patterns. In a specific embodiment, the g-$C_3N_4$@CuO/MgAl$_2$O$_4$ nanohybrid has interplanar spacings of 0.23 nm, 0.219 nm, 0.17 nm, 0.146 nm, 0.122 nm, and 0.10 nm corresponding to (111, CuO), (200, MgO) and (422, spinel), (220, MgO), (620, spinel) and (622, spinel) diffraction planes.

In some embodiments, the g-$C_3N_4$@CuO/MgAl$_2$O$_4$ nanohybrid is crystalline. In some embodiments, the g-$C_3N_4$@CuO/MgAl$_2$O$_4$ nanohybrid has a d-value of 0.15 to 0.17 nm, preferably 0.152 to 0.168 nm, preferably 0.154 to 0.166 nm, preferably 0.156 to 0.164 nm, more preferably 0.158 to 0.162 nm, and yet more preferably about 0.16 nm, corresponding to a lattice spacing of (422). In some embodiments, the g-$C_3N_4$@CuO/MgAl$_2$O$_4$ nanohybrid has an interplanar spacing of 0.24 to 0.26 nm, preferably 0.242 to 0.258 nm, preferably 0.244 to 0.256 nm, 0.246 to 0.254 nm, more preferably 0.248 to 0.252 nm, and yet more preferably about 0.25 nm, corresponding to a (222) diffraction plane, according to high-resolution transmission electron microscopy (HR-TEM). In some embodiments, the g-$C_3N_4$@CuO/MgAl$_2$O$_4$ nanohybrid has an interplanar spacing of 0.19 to 0.21 nm, preferably 0.192 to 0.208 nm, preferably 0.194 to 0.206 nm, 0.196 to 0.204 nm, more preferably 0.198 to 0.202 nm, and yet more preferably about 0.2 nm, corresponding to a (400) diffraction plane, according to HR-TEM. In some embodiments, the g-$C_3N_4$@CuO/MgAl$_2$O$_4$ nanohybrid has an interplanar spacing of 0.32 to 0.34 nm, preferably 0.322 to 0.338 nm, preferably 0.324 to 0.336 nm, 0.326 to 0.334 nm, more preferably 0.328 to 0.332 nm, and yet more preferably about 0.33 nm, corresponding to a (002) diffraction plane, according to HR-TEM.

In one embodiment, the g-$C_3N_4$@CuO/MgAl$_2$O$_4$ nanohybrid comprises a copper oxide (CuO) phase, a magnesium oxide (MgO) phase, a magnesium aluminum oxide (MgAl$_2$O$_4$) phase, and a graphite-phase carbon nitride (g-C$_3$N$_4$) phase.

In some embodiments, the CuO phase may exist in various crystalline phases such as, monoclinic, tenorite, hexagonal, cubic, tetragonal, orthorhombic, a combination thereof, and the like. In a preferred embodiment, the CuO phase is tenorite. In some embodiments, MgO may exist in various phases including, but not limited to, cubic, hexagonal, tetragonal, a combination thereof, and the like. In a preferred embodiment, the MgO phase is cubic. In some embodiments, the graphitic carbon nitride (g-C$_3$N$_4$) may exist in crystalline phases such as α- (alpha), β- (beta), γ- (gamma), combinations thereof, and the like.

In some embodiments, the MgAl$_2$O$_4$ phase is spinel. The spinel phase is a mixed oxide with the general formula AB$_2$O$_4$, including one divalent cation (A$^{2+}$) and two trivalent cations (B$^{3+}$). The unit cell consists of a face-centered cubic arrangement of oxygen ions, containing 32 O$^{2-}$ ions, with 64 tetrahedral and 32 octahedral sites occupied by A$^{2+}$ and B$^{3+}$ cations. When one half of the octahedral sites are occupied by B$^{3+}$ cations and one-eighth of the tetrahedral sites are occupied by A$^{2+}$ cations, the spinel phase is termed "normal." When tetrahedral sites are occupied by half of the B$^{3+}$ and octahedral sites by the other half along with A$^{2+}$, the spinel phase is termed "inverse." The spinel phase with the chemical formula MgAl$_2$O$_4$ is a mineral type of this oxide family. MgAl$_2$O$_4$ has been widely used in various applications, such as in metallurgical, electrochemical, radio-technical, and chemical industrial fields, owing to its high thermal stability (melting point at 2135° C., high hardness (16 gigapascal (GPa)), high mechanical resistance, high resistance against chemical attack, wide band gap energy, high electrical resistivity, low thermal expansion coefficient (9.10$^{-6}$ 1/° C.) between 3° and 1400° C., low dielectric constant, low density (3.58 gram per cubic centimeters (g/cm$^3$)), high thermal shock resistance, hydrophobicity, and low surface acidity.

In some embodiments, the CuO phase is incorporated into the MgAl$_2$O$_4$ phase and the g-C$_3$N$_4$ phase. When CuO (tenorite) is incorporated into MgAl$_2$O$_4$ (magnesium aluminate spinel) and g-C$_3$N$_4$ (graphitic carbon nitride) phases, different structural and chemical interactions may occur.

In some embodiments, the g-C$_3$N$_4$ is in the form of nanosheets having an average length of 100 to 500 nm, preferably 120 to 450 nm, preferably 140 to 400 nm, preferably 160 to 350 nm, preferably 180 to 300 nm, preferably 200 to 250 nm, more preferably 220 to 225 nm, and yet more preferably about 222 nm, and an average width of 50 to 250 nm, preferably 60 to 240 nm, preferably 70 to 220 nm, preferably 80 to 200 nm, preferably 90 to 180 nm, preferably 100 to 170 nm, preferably 110 to 160 nm, preferably 120 to 150 nm, more preferably 130 to 140 nm, and yet more preferably about 135 nm. In alternative embodiments, the g-C$_3$N$_4$ may be in the form of nanowires, nanospheres, nanocrystals, nanorectangles, nanotriangles, nanopentagons, nanohexagons, nanoprisms, nanodisks, nanocubes, nanoribbons, nanoblocks, nanotoroids, nanodiscs, nanobarrels, nanogranules, nanowhiskers, nanoflakes, nanofoils, nanopowders, nanoboxes, nanobeads, nanobelts, nano-urchins, nanoflowers, nanostars, tetrapods, mixtures thereof, and the like.

In some embodiments, the copper oxide and the MgAl$_2$O$_4$ are in the form of nanoparticles having an average size of 2 to 10 nm, preferably 3 to 9 nm, preferably 4 to 8 nm, more preferably 5 to 7 nm, and yet more preferably about 5.4 nm, and the copper oxide and the MgAl$_2$O$_4$ nanoparticles are dispersed on the g-C$_3$N$_4$ nanosheets. In some embodiments, the g-C$_3$N$_4$ in the g-C$_3$N$_4$@CuO/MgAl$_2$O$_4$ nanohybrid is in the form of nanosheets, other morphological shapes of g-C$_3$N$_4$ may also be possible. In a specific embodiment, the g-C$_3$N$_4$@CuO/MgAl$_2$O$_4$ nanohybrid shows a two-dimensional porous structure constructed with curled and wrinkled nanosheets and platelets of the g-C$_3$N$_4$.

In some embodiments, no more than 1 percent by weight (wt. %), preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, more preferably less than 0.1 wt. %, and yet more preferably less than 0.05 wt. % Al$_2$O$_3$ is present in the g-C$_3$N$_4$@CuO/MgAl$_2$O$_4$ nanohybrid based on a total weight of the g-C$_3$N$_4$@CuO/MgAl$_2$O$_4$ nanohybrid. The minimal presence of Al$_2$O$_3$ (less than 1 wt. %) in the g-C$_3$N$_4$@CuO/MgAl$_2$O$_4$ nanohybrid helps to maintain enhanced catalytic properties, high surface reactivity, and efficient adsorption. This promotes good performance in environmental remediation, energy production, and biomedical applications, free from interference by less reactive Al$_2$O$_3$ phases. In a preferred embodiment, the g-C$_3$N$_4$@CuO/MgAl$_2$O$_4$ nanohybrid does not include aluminum oxide (Al$_2$O$_3$).

The following examples are provided solely for illustration and are not to be construed as limitations of the present disclosure, as many variations thereof are possible without departing from the spirit and scope of the present disclosure.

EXAMPLES

The following examples describe and demonstrate a method for synthesizing a graphite-phase carbon nitride copper oxide and magnesium aluminum oxide (g-C$_3$N$_4$@CuO/MgAl$_2$O$_4$) nanohybrid. The examples are provided solely for illustration and are not to be construed as limitations of the present disclosure, as many variations thereof are possible without departing from the spirit and scope of the present disclosure.

Example 1: Fabricating the g-C$_3$N$_4$@CuO/ MgAl$_2$O$_4$ (10:5:85 wt. %) Nanohybrid Magnesium nitrate and aluminum nitrate were added together in one beaker with copper nitrate to produce a CuO/MgAl$_2$O$_4$ material. About 10 grams (g) of menthol as fuel was added to the beaker, followed by 30 milliliters (mL) of distilled water. The beaker was heated until a clear solution was obtained, and the clear solution was heated further until dryness. The product was ground in a mortar, transferred to a 150 mL porcelain dish, and calcined at 700° C. for 3 hours. The CuO/MgAl$_2$O$_4$ product was cooled to room temperature, weighed, and ground with urea to produce a g-C$_3$N$_4$@CuO/MgAl$_2$O$_4$ (10:5:85 wt. %) nanohybrid. The quadruple mixture was returned and heated to 600° C. for 40 minutes in a covered porcelain crucible, and subsequently, the g-C$_3$N$_4$@CuO/MgAl$_2$O$_4$ (10:5:85 wt. %) nanohybrid was collected.

Example 2: Characterizations

X-ray diffraction (XRD) was used to identify crystalline states employing the JDX-8030 X-ray (JEOL), made in Japan. Cu-filtered Cu-Kα radiation (1.5418 Å) powered at 45 kV and 10 mA was used to run the patterns. The g-C$_3$N$_4$@CuO/MgAl$_2$O$_4$ nanohybrid was tested at ambient temperatures in a range of 2θ=5 to 80°. The surface morphologies of the g-$C_3N_4$@CuO/$MgAl_2O_4$ nanohybrid was analyzed by transmission electron microscopy (TEM), selected area electron diffraction (SAED), and high-resolution transmission electron microscopy (HR-TEM), obtained using a Tecnai-G20 (USA) transmission electron microscope with a 200 kV speed voltage. Nitrogen ($N_2$) adsorption isotherm obtained at 77 K using a Micrometrics ASAP 2020 Brinauer-Emmett-Teller (BET) analyzer was used to calculate the surface characteristics, specifically the BET surface area, total pore volume (Vp), and mean pore radius (r). Before commencement of the measurements, the samples were degassed for three hours at 200° C. with a decreased pressure of $10^{-5}$ Torr.

Figure 2:
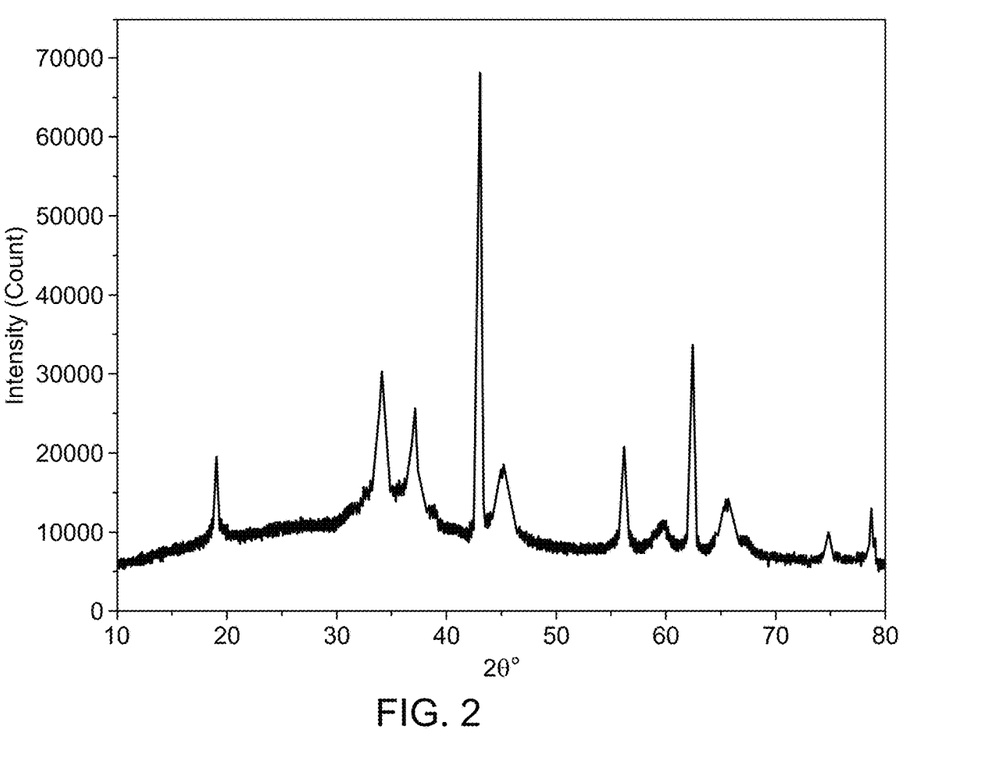
FIG. 2 is a graph depicting X-ray diffraction (XRD) patterns of the g-$C_3N_4$@CuO/$MgAl_2O_4$ nanohybrid, according to certain embodiments.

XRD was used to examine the crystallinity and phase identification of the g-$C_3N_4$@CuO/$MgAl_2O_4$ catalyst, as seen in FIG. 2. High crystalline structure of the powder is indicated by pronounced peaks and elevated intensity values. CuO, MgO, $MgAl_2O_4$, and g-$C_3N_4$ phases were detected when the diffraction patterns were compared to the normal Joint Committee on Powder Diffraction Standards (JCPDS) cards. The $MgAl_2O_4$ spinel phase was indexed to 2θ of 18.9°, 37.0°, 38.9°, 45.2°, 56.1°, 65.01°, 74.7°, and 78.7°. The observed diffractions correspond to the (111), (311), (222), (400), (422), (440), (620), and (622) planes of the cubic phase of $MgAl_2O_4$ spinel, respectively, (COD No. 9002164). The cubic phase of MgO (COD No. 9006789) was detected at 2θ of 37.0°, 43.0°, 62.4°, and 74.7°, corresponding to (111), (200), (220), and (311) diffraction planes, respectively. The coexistence of MgO and the $MgAl_2O_4$ spinel phase has been documented [Ibrahim, T. G. et al., Eliminating manifold pharmaceutical pollutants with carbon nanoparticles driven via a short-duration ball-milling process, *Surfaces*, 2024, 7, 3, 493-507, which is incorporated herein by reference in its entirety]. Diffractions at 2θ of 38.9° and 65.5° correspond to the tenorite phase of CuO (COD No. 9016326). The presence of mild diffraction from CuO signifies a total dissolution of CuO across the lattices of both spinel and g-$C_3N_4$. Diffractions associated with g-$C_3N_4$ were recorded at 36.9°, 45.8°, and 59.1° (COD No. 1534042). No other phases, such as $Al_2O_3$, were identified confirming the effective synthesis of the g-$C_3N_4$@CuO/$MgAl_2O_4$ nanocomposite.

Figure 3A:
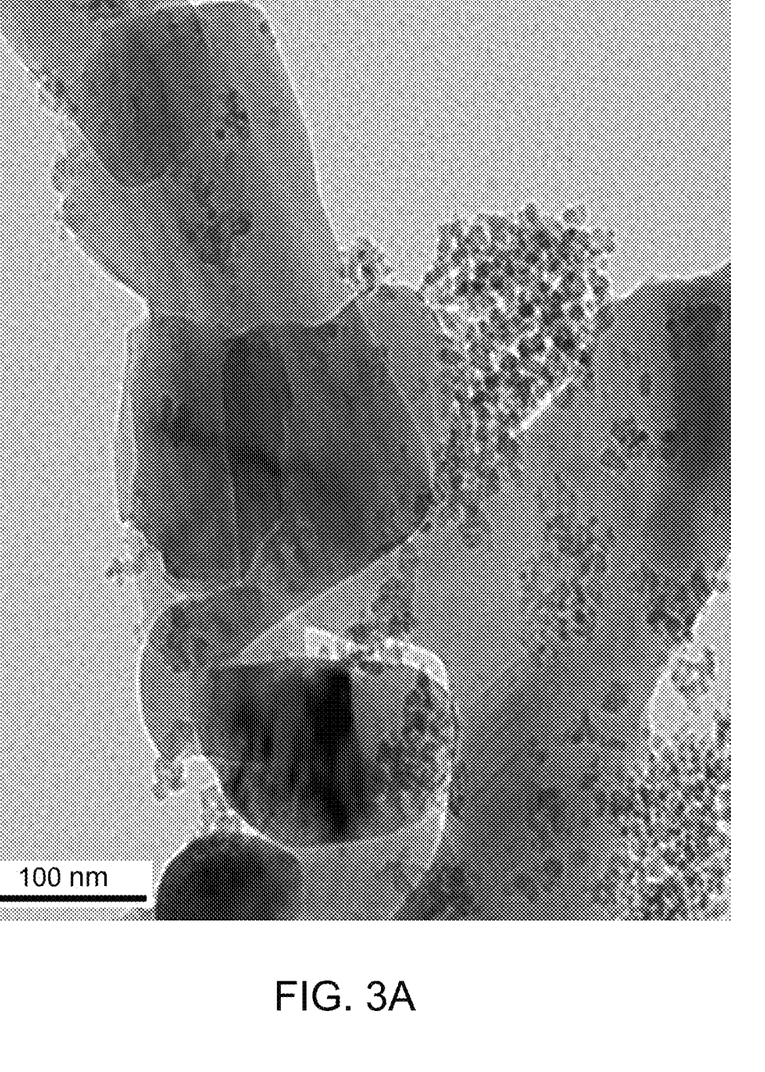
FIG. 3A is a transmission electron microscopy (TEM) image of the g-$C_3N_4$@CuO/$MgAl_2O_4$ nanohybrid, according to certain embodiments.
Figure 3B:
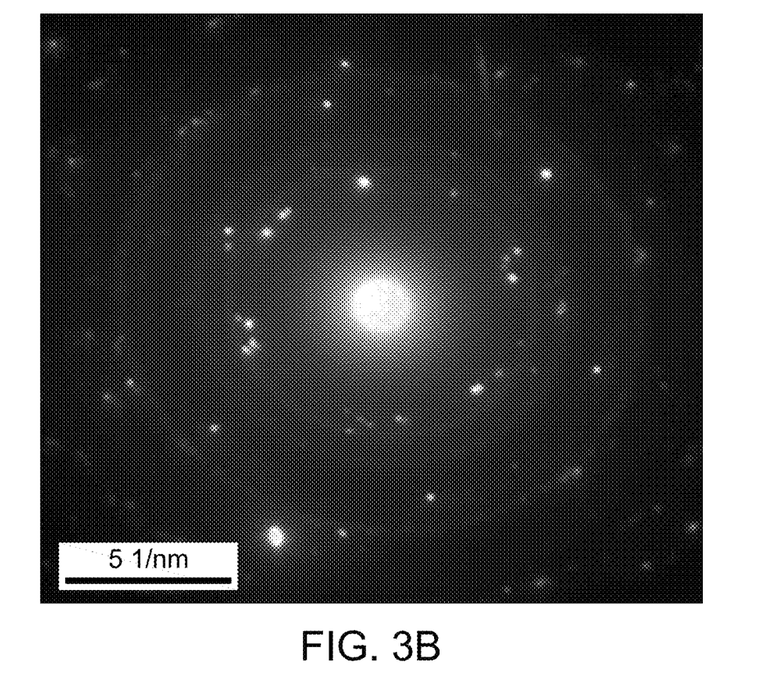
FIG. 3B depicts a selected area electron diffraction (SAED) analysis of the g-$C_3N_4$@CuO/$MgAl_2O_4$ nanohybrid, according to certain embodiments.
Figure 3C:
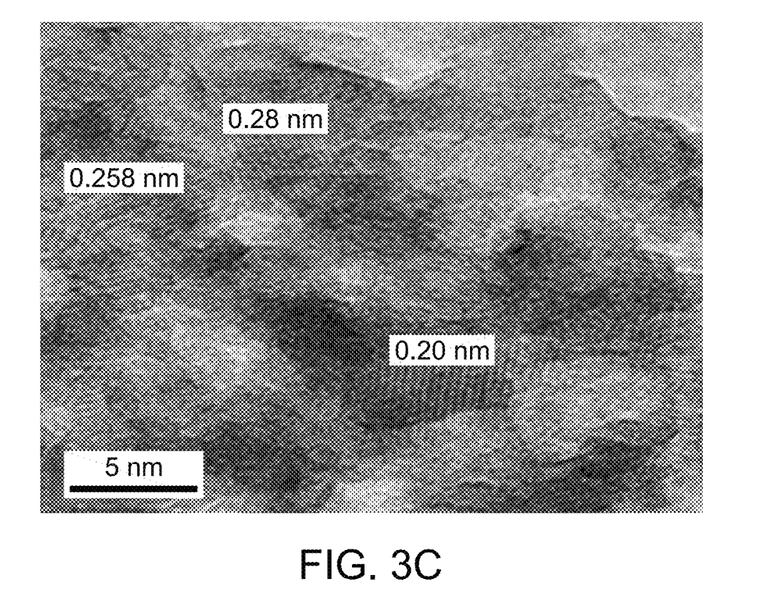
FIG. 3C is a high-resolution transmission electron microscopy (HR-TEM) image of the g-$C_3N_4$@CuO/$MgAl_2O_4$ nanohybrid, according to certain embodiments.
Figure 3D:
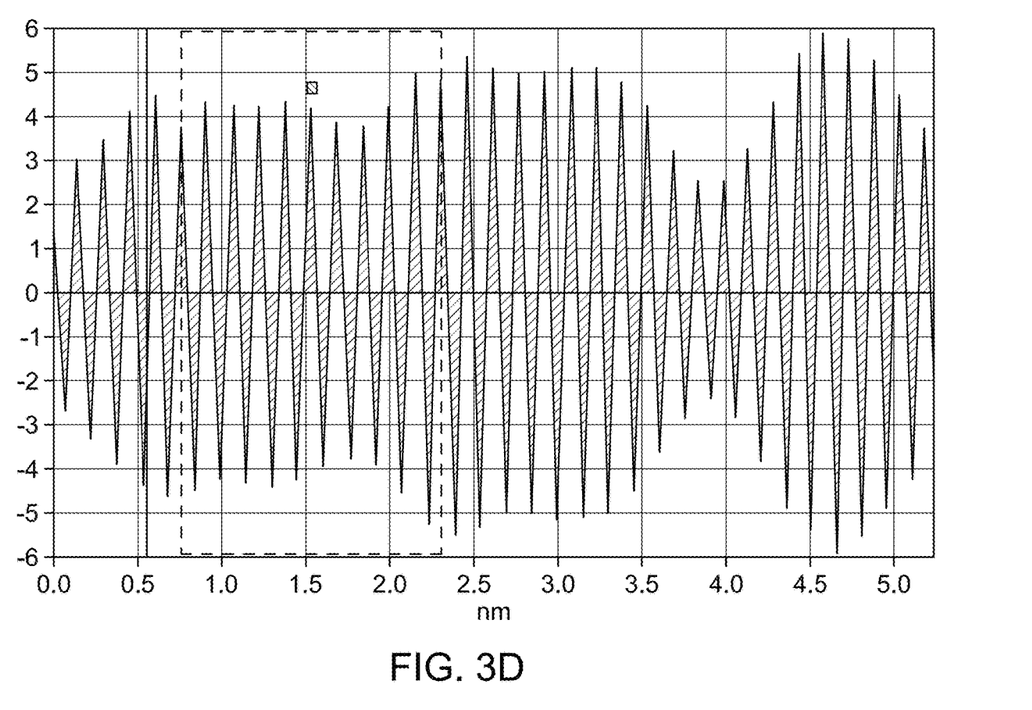
FIG. 3D is a fast Fourier transform (FFT) spectra of the g-$C_3N_4$@CuO/$MgAl_2O_4$ nanohybrid, according to certain embodiments.
Figure 3E:
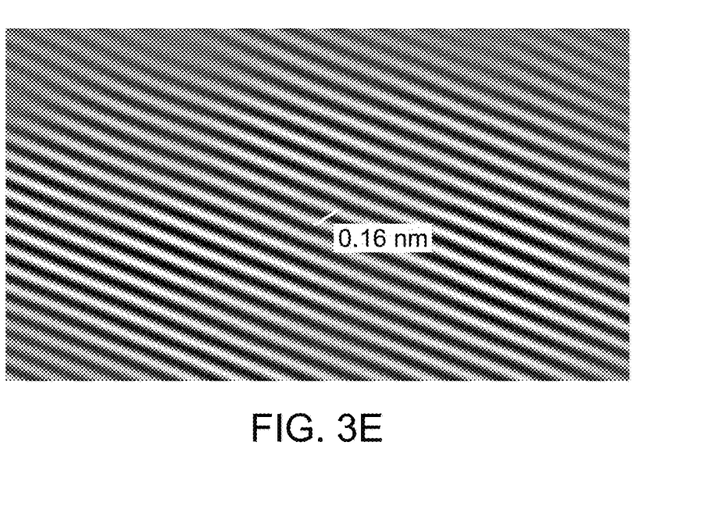
FIG. 3E is an inverse fast Fourier transform (IFFT) spectra of the g-$C_3N_4$@CuO/$MgAl_2O_4$ nanohybrid, according to certain embodiments.

TEM images of g-$C_3N_4$@CuO/$MgAl_2O_4$ nanohybrid are shown in FIG. 3A. The TEM images show a two-dimensional porous structure constructed with curled and wrinkled nanosheets and platelets of the g-$C_3N_4$ with average width of about 135 nanometers (nm) and average length of about 222 nm. FIG. 3A shows dispersion of homogeneous spherical metal oxide nanoparticles with a size of about 5.4 nm on nanosheets of g-$C_3N_4$. The SAED pattern of the g-$C_3N_4$@CuO/$MgAl_2O_4$ nanohybrid reveals diffraction spots with interplanar spacings of 0.23 nm, 0.219 nm, 0.17 nm, 0.146 nm, 0.122 nm, and 0.10 nm due to (111, CuO), (200, MgO) and (422, spinel), (220, MgO), (620, spinel) and (622, spinel) diffraction planes, respectively, as shown in FIG. 3B. The HR-TEM of the g-$C_3N_4$@CuO/$MgAl_2O_4$ nanohybrid shows a plane spacing of 0.33 nm related to the (002) diffraction plane of CN, and plane spacings of 0.25 nm and 0.2 nm related to the (222) and (400) diffraction planes, respectively, of the spinel, characterizing a heterostructure formation, as shown in FIG. 3C. Fast Fourier transform (FFT) and inverse fast Fourier transform (IFFT) measurements show a d-value of 0.16 nm given to g-$C_3N_4$@CuO/$MgAl_2O_4$ nanohybrid, signifying the lattice spacing of (422), indicating the development of spinel structure, as shown in FIGS. 3D-3E.

Figure 4A:
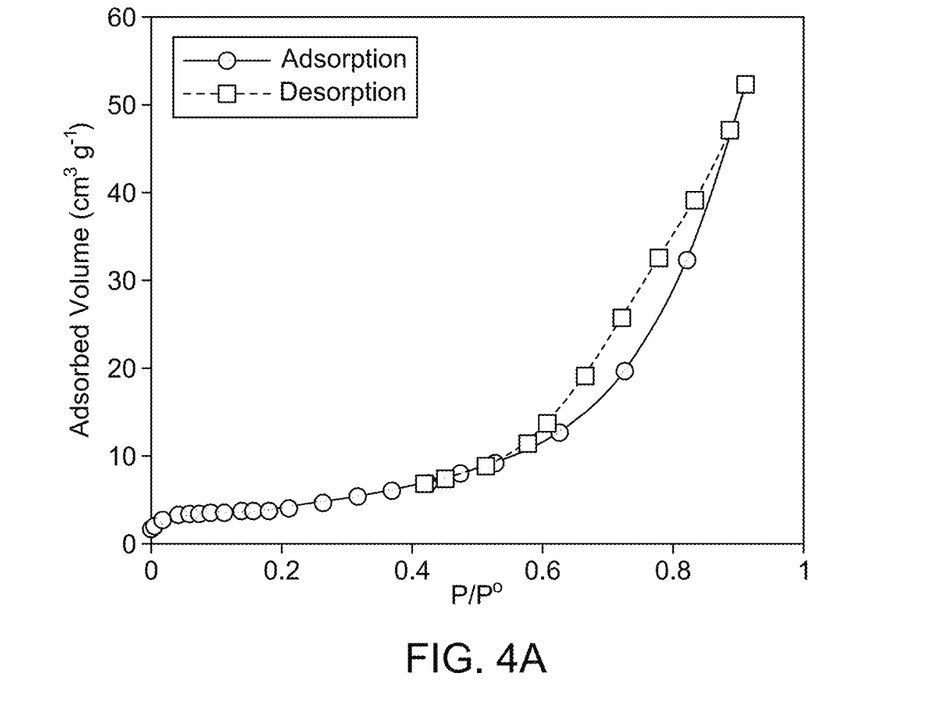
FIG. 4A is a graph depicting nitrogen adsorption-desorption isotherm of the g-$C_3N_4$@CuO/$MgAl_2O_4$ nanohybrid, according to certain embodiments.
Figure 4B:
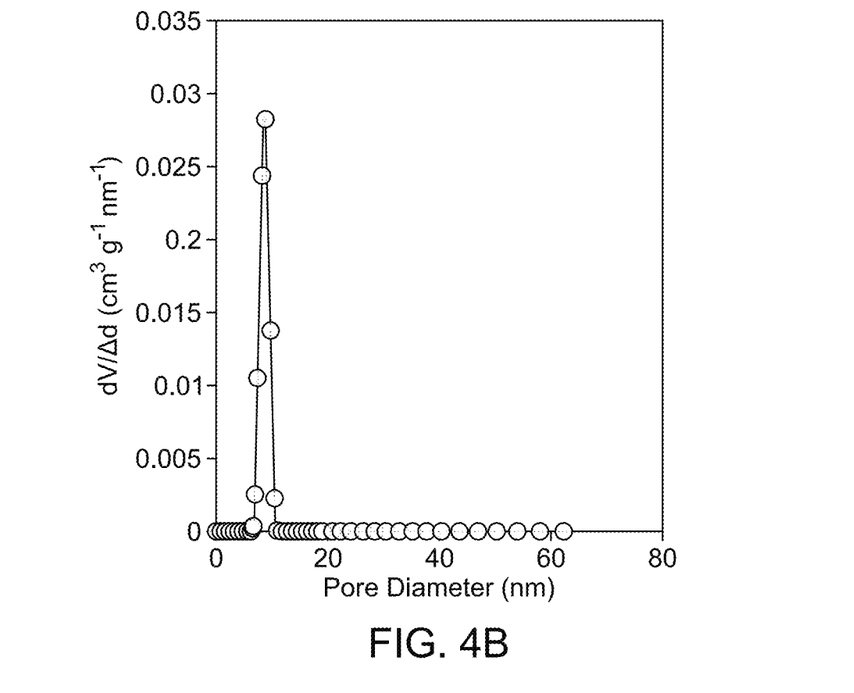
FIG. 4B is a graph depicting pore size distribution of the g-$C_3N_4$@CuO/$MgAl_2O_4$ nanohybrid, according to certain embodiments.

FIGS. 4A-4B depict nitrogen adsorption-desorption isotherms of the g-$C_3N_4$@CuO/$MgAl_2O_4$ nanohybrid. The nitrogen sorption isotherm of the nanohybrid relates to a type IV hysteresis with a clear hysteresis loop, indicating a formation of mesoporous structures; however, shifting the loop to a relatively lower pressure ($P/P^0$=0.59 to 1) suggests a decrease in the size of the mesopores which may result from the deposition of metal oxide particles in the wide pores of g-$C_3N_4$. The BET surface area of the g-$C_3N_4$@CuO/$MgAl_2O_4$ nanohybrid was calculated to be 23.21 $m^2$ $g^{-1}$. The marked high specific surface area reflects desirable dispersion of the metal oxide nanoparticles on the g-$C_3N_4$. Pore size distribution curves plotted using the BJH method, for the g-$C_3N_4$@CuO/$MgAl_2O_4$ nanohybrid, exhibited unimodal distribution with average pore diameters maximized at 8.34 nm and pore volume of 0.081 $cm^3$ $g^{-1}$. The isotherms belong to H3 types of pores, which do not exhibit limiting adsorption at high $P/P^0$ and may arise due to aggregation of plate-like particles giving rise to slit-shaped pores. The assembly of g-$C_3N_4$@CuO/$MgAl_2O_4$ composite provoked a mesoporous array.

Numerous modifications and variations of the present disclosure are possible in light of the above teachings. It is, therefore, to be understood that within the scope of the appended claims, the disclosure may be practiced otherwise than as specifically described herein.

The invention claimed is:

1. A method for synthesizing a g-$C_3N_4$@CuO/$MgAl_2O_4$ nanohybrid, comprising:
   mixing a magnesium salt, an aluminum salt, a copper salt, and menthol in water to form a solution;
   heating the solution to form a solid;
   calcinating the solid at a temperature of 600 to 800° C. for 2 to 4 hours to form a metal product;
   mixing the metal product with urea and heating to a temperature of 550 to 650° C. for 20 to 60 minutes to form the g-$C_3N_4$@CuO/$MgAl_2O_4$ nanohybrid,
   wherein the g-$C_3N_4$@CuO/$MgAl_2O_4$ nanohybrid comprises graphite-phase carbon nitride (g-$C_3N_4$) in an amount of 2 to 20 percent by weight (wt. %), copper oxide in an amount of 1 to 10 wt. %, and magnesium aluminum oxide ($MgAl_2O_4$) in an amount of 75 to 95 wt. % based on a total weight of the g-$C_3N_4$@CuO/$MgAl_2O_4$ nanohybrid.

2. The method of claim 1, wherein a weight ratio of the menthol to the copper salt is from 10:1 to 1:10.

3. The method of claim 1, wherein the g-$C_3N_4$@CuO/$MgAl_2O_4$ nanohybrid comprises graphite-phase carbon nitride (g-$C_3N_4$) in an amount of 5 to 15 percent by weight (wt. %), copper oxide in an amount of 3 to 7 wt. %, and magnesium aluminum oxide ($MgAl_2O_4$) in an amount of 80 to 90 wt. % based on a total weight of the g-$C_3N_4$@CuO/$MgAl_2O_4$ nanohybrid.

4. The method of claim 3, wherein the g-$C_3N_4$ is in the form of nanosheets having an average length of 100 to 500 nm and an average width of 50 to 250 nm.

5. The method of claim 4, wherein the copper oxide and the $MgAl_2O_4$ are in the form of nanoparticles having an average size of 2 to 10 nm and the copper oxide and the $MgAl_2O_4$ nanoparticles are dispersed on the g-$C_3N_4$ nanosheets.

6. The method of claim 1, wherein the g-$C_3N_4$@CuO/$MgAl_2O_4$ nanohybrid has a Brunauer-Emmett-Teller (BET) surface area of 15 to 30 $m^2$ $g^{-1}$.

7. The method of claim 1, wherein the g-$C_3N_4$@CuO/$MgAl_2O_4$ nanohybrid is porous and has an average pore diameter of 5 to 10 nm.

8. The method of claim 1, wherein the g-$C_3N_4$@CuO/$MgAl_2O_4$ nanohybrid is porous and has an average pore volume of 0.01 to 0.2 $cm^3$ $g^{-1}$.

9. The method of claim 1, wherein the g-$C_3N_4$@CuO/$MgAl_2O_4$ nanohybrid is porous, and the pores are in the form of slits.

10. The method of claim 1, wherein the g-$C_3N_4$@CuO/$MgAl_2O_4$ nanohybrid is crystalline.

11. The method of claim 1, wherein the g-$C_3N_4$@CuO/$MgAl_2O_4$ nanohybrid comprises a copper oxide (CuO) phase, a magnesium oxide (MgO) phase, a magnesium aluminum oxide ($MgAl_2O_4$) phase, and a graphite-phase carbon nitride (g-$C_3N_4$) phase.

12. The method of claim 11, wherein the $MgAl_2O_4$ phase is spinel.

13. The method of claim 11, wherein the MgO phase is cubic.

14. The method of claim 11, wherein the CuO phase is tenorite.

15. The method of claim 11, wherein the CuO phase is incorporated into the $MgAl_2O_4$ phase and the g-$C_3N_4$ phase.

16. The method of claim 1, wherein the g-$C_3N_4$@CuO/$MgAl_2O_4$ nanohybrid does not comprise aluminum oxide ($Al_2O_3$).

17. The method of claim 1, wherein the g-$C_3N_4$@CuO/$MgAl_2O_4$ nanohybrid has an interplanar spacing of 0.32 to 0.34 nm corresponding to a (002) diffraction plane of CN.

18. The method of claim 1, wherein the g-$C_3N_4$@CuO/$MgAl_2O_4$ nanohybrid has an interplanar spacing of 0.22 to 0.24 nm, 0.21 to 0.23 nm, 0.16 to 0.18 nm, 0.14 to 0.15 nm, 0.11 to 0.13 nm, and 0.09 to 0.11 nm corresponding to (111), (200), (422), (220), (620), and (622) diffraction planes, respectively.

19. The method of claim 1, wherein the g-$C_3N_4$@CuO/$MgAl_2O_4$ nanohybrid has an interplanar spacing of 0.24 to 0.26 nm and 0.19 to 0.21 nm corresponding to (222) and (400) diffraction planes, respectively.

20. The method of claim 1, wherein the g-$C_3N_4$@CuO/$MgAl_2O_4$ nanohybrid has a d-value of 0.15 to 0.17 nm corresponding to a lattice spacing of (422).

\* \* \* \* \*